United States Patent [19]

Robinson

[11] Patent Number: 5,285,706
[45] Date of Patent: Feb. 15, 1994

[54] PIPE THREADING APPARATUS

[75] Inventor: Jerry H. Robinson, Mobile, Ala.

[73] Assignee: Wellcutter Inc., Brewton, Ala.

[21] Appl. No.: 849,711

[22] Filed: Mar. 11, 1992

[51] Int. Cl.⁵ .............................................. B23B 3/22
[52] U.S. Cl. ........................................ 82/113; 82/110
[58] Field of Search ................... 82/110, 113; 408/106, 408/125

[56] References Cited

U.S. PATENT DOCUMENTS

| | | | |
|---|---|---|---|
| 1,875,673 | 9/1932 | Stockstill | 166/95 X |
| 1,884,040 | 10/1932 | Marler | 166/79 |
| 3,095,929 | 7/1963 | McGuire et al. | 166/97 |
| 4,016,856 | 4/1977 | Mclaughlin | 125/21 |
| 4,192,376 | 3/1980 | Lissmyr | 166/53 |
| 4,266,605 | 5/1981 | LaBorde et al. | 166/97 |
| 4,383,577 | 5/1983 | Pruitt | 166/95 |
| 4,423,774 | 1/1984 | Mefford | 166/77.5 |
| 4,461,354 | 7/1984 | Buras et al. | 166/343 |
| 4,484,502 | 11/1984 | Ebner | 83/651.1 |
| 4,716,961 | 1/1988 | Makins, Jr. et al. | 166/68.5 |
| 4,739,685 | 4/1988 | Ricci . | |
| 4,791,842 | 12/1988 | Olson | 82/113 |
| 4,829,860 | 5/1989 | VanderPol | 82/113 |
| 4,854,200 | 8/1989 | Mynhier | 82/113 |
| 4,813,314 | 3/1989 | Kwech | 82/113 |

FOREIGN PATENT DOCUMENTS

0437220 11/1926 Fed. Rep. of Germany ...... 408/106
0906532 7/1949 Fed. Rep. of Germany ...... 408/106
2210668 9/1973 Fed. Rep. of Germany ...... 408/106

Primary Examiner—Paula A. Bradley
Assistant Examiner—Erik R. Puknys
Attorney, Agent, or Firm—Nixon & Vanderhye

[57] ABSTRACT

Systems and methods for cutting a well casing and then capping the cut well casing are provided. A well casing cutting assembly having a tensioned wire cutting element may first be moved into position relative to the well casing and operated so that the cutting element reciprocates transversely (i.e., in saw-like fashion) while simultaneously being advanced forwardly into cutting relationship with the well casing. The cutting assembly is removed from the cut well casing and replaced with a well capping assembly having a shield enclosure and a thread cutting subassembly. The thread cutting subassembly includes an interiorly threaded pipe coupling which rigidly carries a normally open, remotely controlled valving assembly and is mounted to the shield enclosure so as to be capable of both rotational and vertical movements relative to the cut well casing. By simultaneously rotating and downwardly displacing the thread cutting element, threads will be formed on the exterior surface of the well casing and will threadably couple the pipe coupling automatically thereto. The valving mechanism may then be operated so as to cap the well casing. Structure is provided which enable quick disassembly of the thread cutting subassembly from the pipe coupling so that the well capping assembly can be removed and reused.

17 Claims, 9 Drawing Sheets

PIPE THREADING APPARATUS

FIELD OF INVENTION

This invention relates to systems, apparatus and methods for cutting and capping a well head so as to stop the uncontrolled flow of oil and/or gas during "blow-out" conditions or to allow field threading of a well head for maintenance and/or repair.

BACKGROUND AND SUMMARY OF THE INVENTION

The uncontrolled flow of oil and/or gas from a subterranean well presents significant problems not only in terms of environmental contamination from the fluid issuing from the well, but also in terms of personal injury risks to those workers who undertake the responsibility to stem the uncontrolled fluid flow. In this connection, the fluid which issues from the well head is at extremely high velocities. If the uncontrolled flow of oil and/or gas is ignited, therefore, a relatively large area surrounding the burning well head becomes an inferno which compounds the problems associated with well head capping.

Equipment which are especially adapted to cap the uncontrolled flow of oil and/or gas issuing from a well head are known, for example, as evidenced by U.S. Pat. Nos. 4,192,376 (which utilizes the force of the fluid to responsively seat and engage a clamping device and then activate a valve mechanism), and 4,461,354 (which includes a hydraulically activated remote-controlled clamp which physically engages the exposed end of the pipe stem). These prior attempts, however, do not readily lend themselves to being removed quickly and transported to another well site for reuse (i.e., a need that was recently demonstrated by the mass destruction of Kuwait oil fields during the Persian Gulf War). It is therefore towards fulfilling such a need that the present invention is directed.

Broadly, the present invention resides in systems and methods whereby a well head can be prepared for capping and then capped so as to stem the uncontrolled flow of oil and/or gas therefrom. The invention contemplates the use of discrete shielded cutting and capping assemblies which can be maneuvered into place from a relatively safe distance (e.g., via a self-propelled mobile crane or the like) and then operated in a remote-controlled manner.

The cutting assembly is essentially comprised of an explosion proof shield. Once the cutting assembly has been maneuvered into position, the shield will bound a substantial portion of the well head thereby providing a measure of protection for workers involved in the casing cutting operation. A reciprocally acting wire cutting element may then be advanced into cutting contact with the well head casing. Continual incremental advancement of the cutting assembly will therefore sever the well head casing at a predetermined distance above the ground and thereby provide a casing stub which is then especially adapted to being acted upon by the capping assembly.

The capping assembly according to this invention may then be maneuvered into position after the cutting assembly has been removed from the well head site. The capping assembly has a cylindrical shield which completely bounds the cut well head casing and thereby provides a measure of protection for workers involved in the well head capping operation. A threading subassembly is removably attached below an internally threaded pipe fitting which, in turn, is subjacent to and supports a normally open valving mechanism. The threading subassembly is removably carried coaxially by a rotatable horizontally disposed drive ring which is capable of being controllably moved vertically relative to the well head casing.

Simultaneous rotation and controlled vertical displacement of the drive ring will cause the cutting assembly to form standard threads on the exterior surface of the well head casing. Continued rotation and vertical displacement of the drive ring will thereby cause the internal threads of the pipe fitting to engage the just formed threads on the exterior surface of the well casing (i.e., since the pipe fitting rigidly follows the motion of the threading subassembly). As soon as the pipe fitting engages a sufficient amount of threads on the exterior surface of the well casing, the rotation and vertical displacement of the drive ring is stopped. Subsequent closure of the remotely controlled valving mechanism supported by the pipe fitting will thereby stem the flow of oil and/or gas from the well head at which time the well head is capped. Once the well head is capped, the capping assembly can be relatively easily and quickly removed from the well site simply by disconnecting the threading subassembly from the pipe fitting and then lifting the capping assembly physically away from the now capped well head site.

Further aspects and advantages of the present invention will become more clear after careful consideration is given to the following detailed description of the preferred exemplary embodiments.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1A:
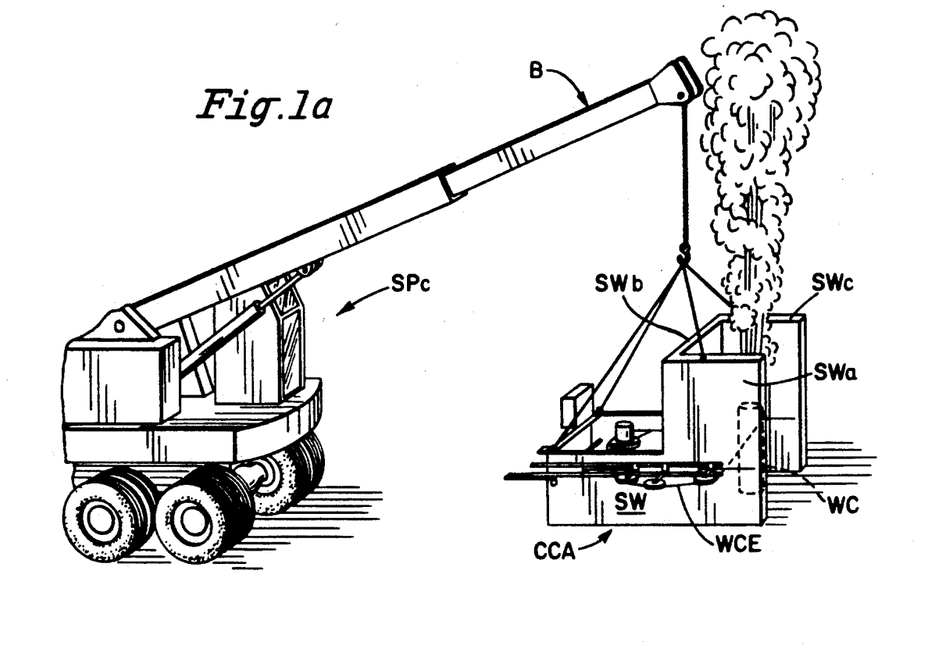
FIGS. 1a through 1d schematically represent the sequence of operation of the cutting and capping assemblies according to this invention when in service to cap the uncontrolled flow of oil and/or gas from a well head.

The basic operations of the cutting and capping system according to this invention are shown schematically in accompanying FIGS. 1a-1d. As is seen in FIG. 1a, well casing cutting assembly CCA is first maneuvered into position by any suitable means, for example, a self-propelled crane SPC. The boom B of the crane SPC can thus be positioned over the well casing WC so that the cutting assembly CCA can be lowered by the crane operator into position whereby the upright walls $SW_a$-$SW_c$ of the shield SW surround the well casing WC on three sides.

Figure 1B:
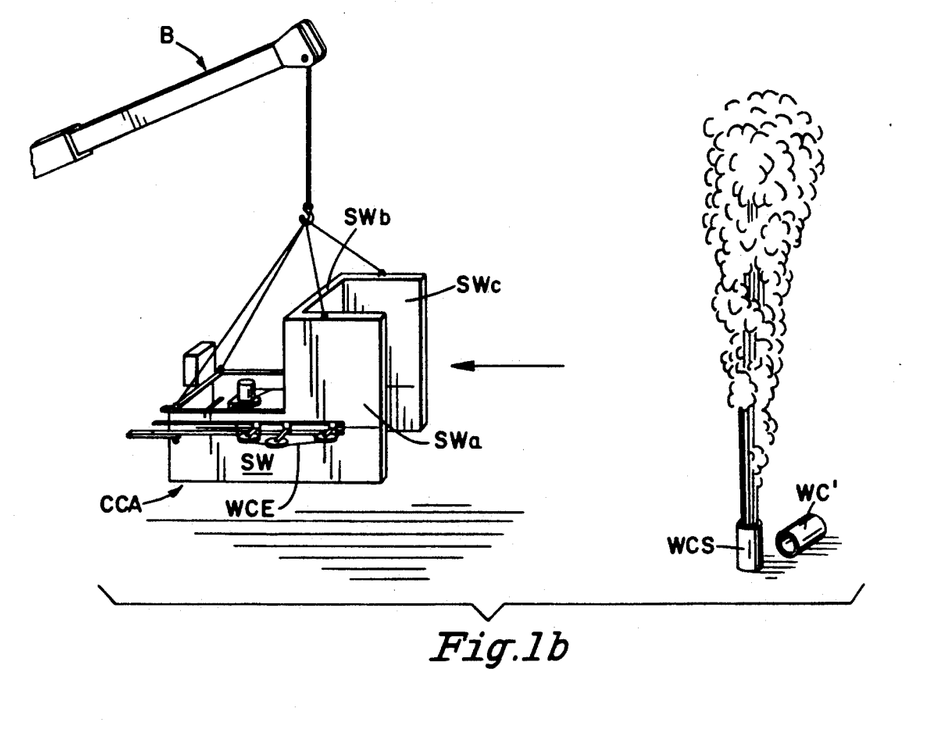

The cutting assembly CCA may then be operated so that the reciprocally moving wire cutting element WCE (which transversely spans the space between walls $SW_a$ and $SW_c$) is advanced forwardly into cutting relationship with the well casing WC (as will be explained in greater detail below). The wire cutting element is most preferably a diamond wire or other suitably hardened flexible metal cutting element capable of performing cutting operations on the steel of the well casing WC. Once the upper section of the well casing WC' has been cut from the remaining stub portion of the well casing (hereinafter referred to as the well casing stub WCS), the crane SPC can remove the cutting assembly CCA from the vicinity of the well casing WC as is shown in FIG. 1b.

Figure 1C:
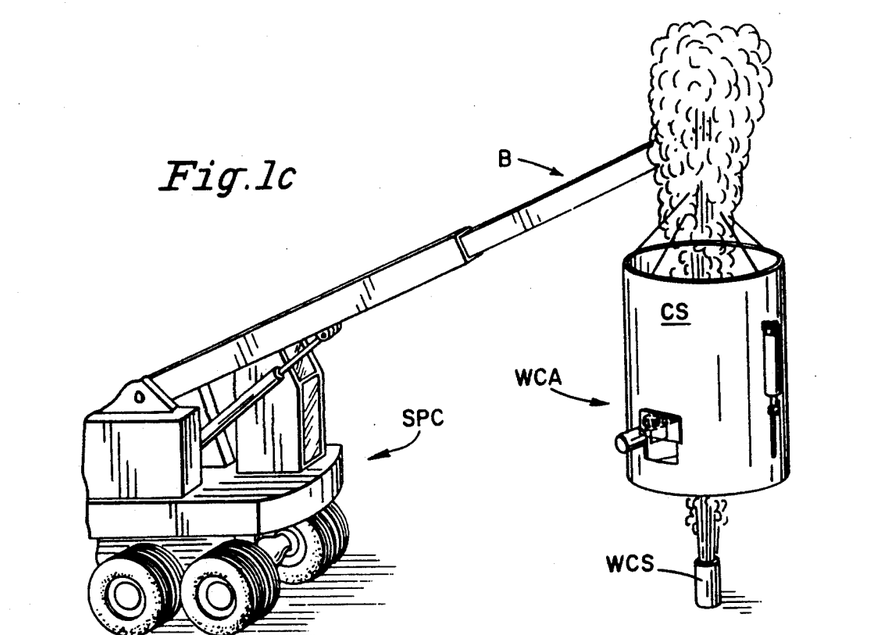
Figure 1D:
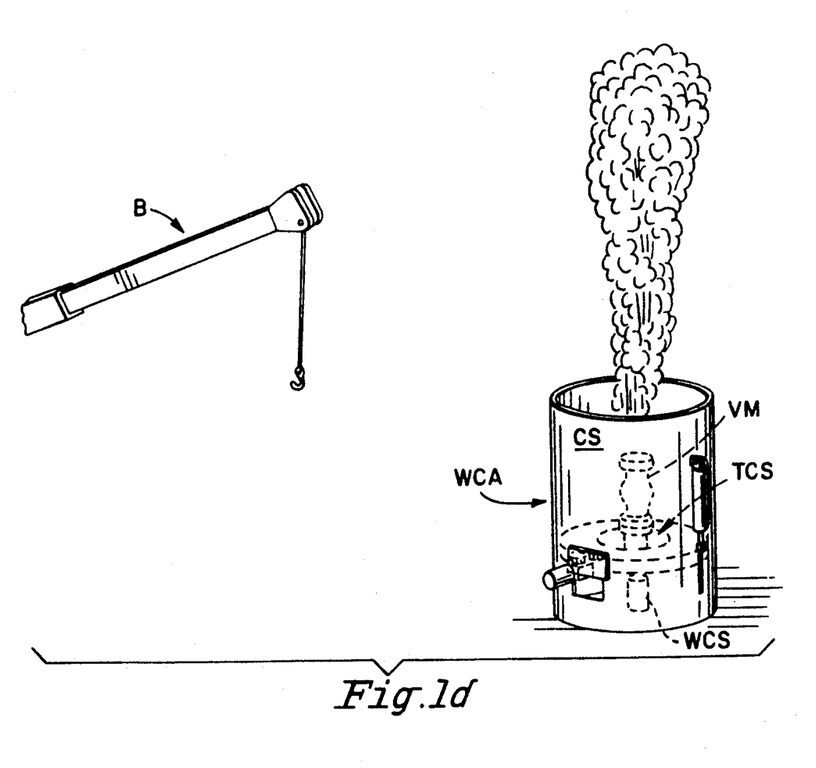
Figure 2:
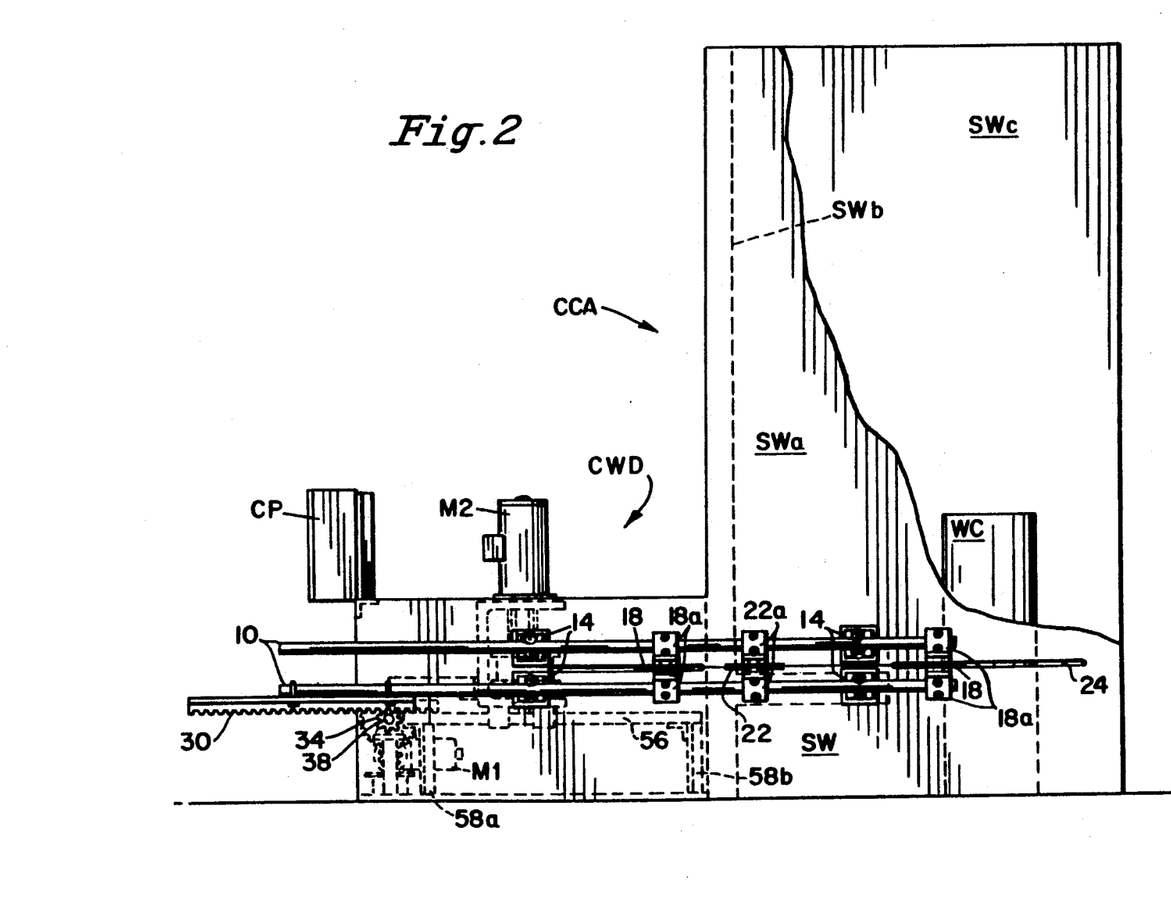
FIG. 2 is a side elevation view of the cutting assembly according to the present invention.

The boom B of crane SPC can then be coupled to the well capping assembly WCA and initially positioned over the well casing stub WCS as shown in FIG. 1c. As is shown, for example in FIG. 1d, the well capping assembly WCA may be guided into position relative to the well casing stub WCS so that the thread cutting subassembly TCS, and hence the valve mechanism VM, are in substantial alignment with one another. Operation of the thread cutting subassembly TCS (as will be described in greater detail below) and subsequent remote controlled closure of the valve mechanism VM will thereby cap the well casing stub WCS and thereby stem the uncontrolled flow of oil and/or gas therefrom.

The cutting assembly CCA according to this invention is more clearly shown in accompanying FIGS. 2-5. As was briefly mentioned above, the cutting assembly CCA includes a shield structure SW having opposed upright lateral shield walls $SW_a$ and $SW_c$ which are rigidly separated by means of a rear shield wall $SW_b$ and a lower transverse support wall $SW_d$ (see FIGS. 3 and 5). These walls will thus collectively serve to protect substantially workers from hazards encountered during the well casing WC cutting operation.

That portion of the shield SW which extends rearwardly of the shield walls $SW_a$-$SW_b$ serve as a lateral support for the cutting wire drive subassembly CWD which not only imparts reciprocal (i.e., saw-like) motion to the cutting wire element WCE, but also serves to controllably advance the wire cutting element WCE into cutting relationship to the well casing WC.

Figure 3:
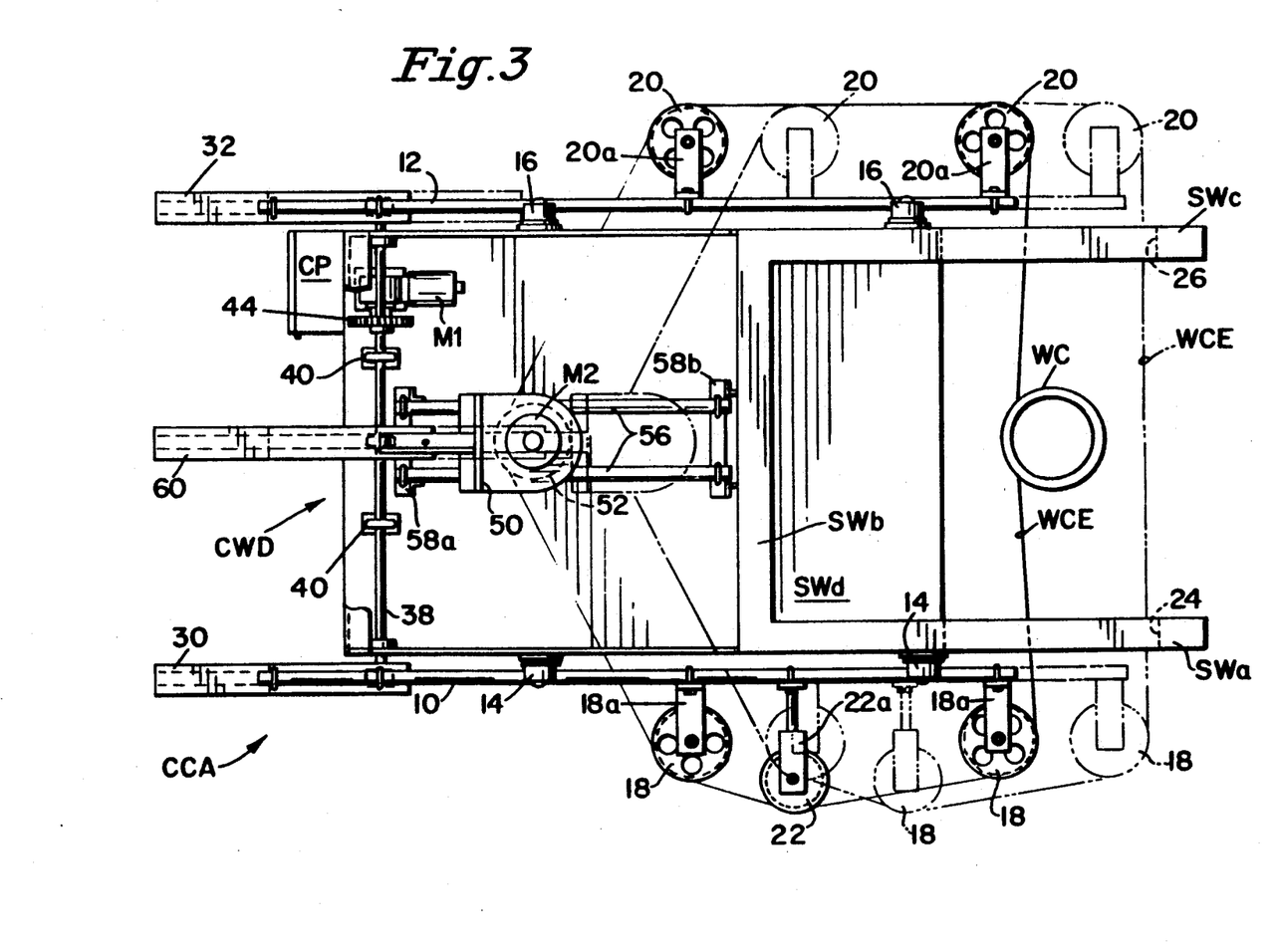
FIGS. 3-5 are respectively top plan, rear elevation and front elevation views of the cutting assembly shown in FIG. 2.
Figure 4:
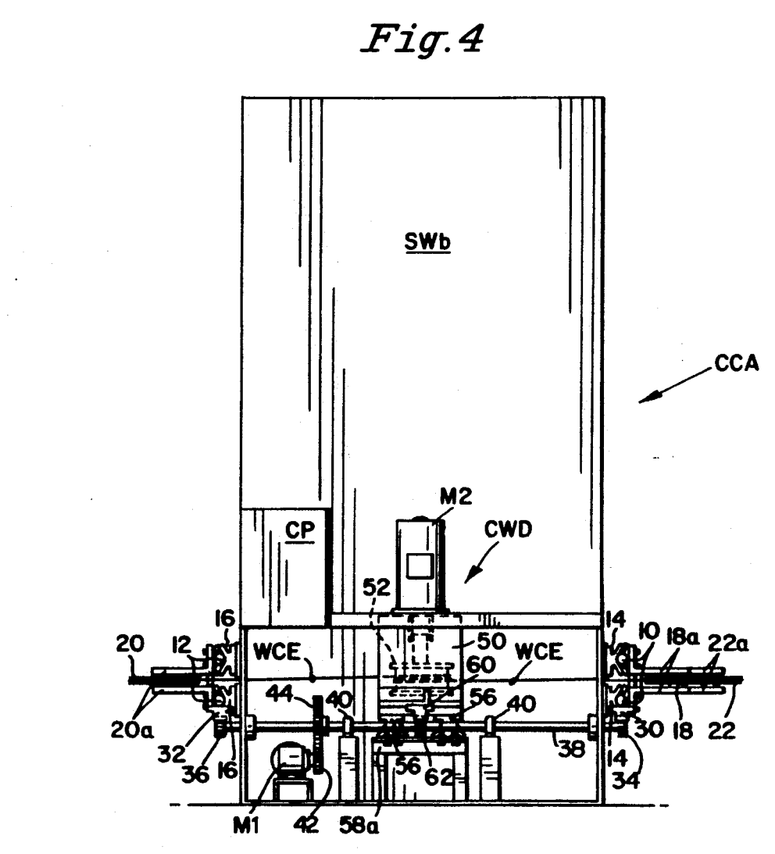
Figure 5:
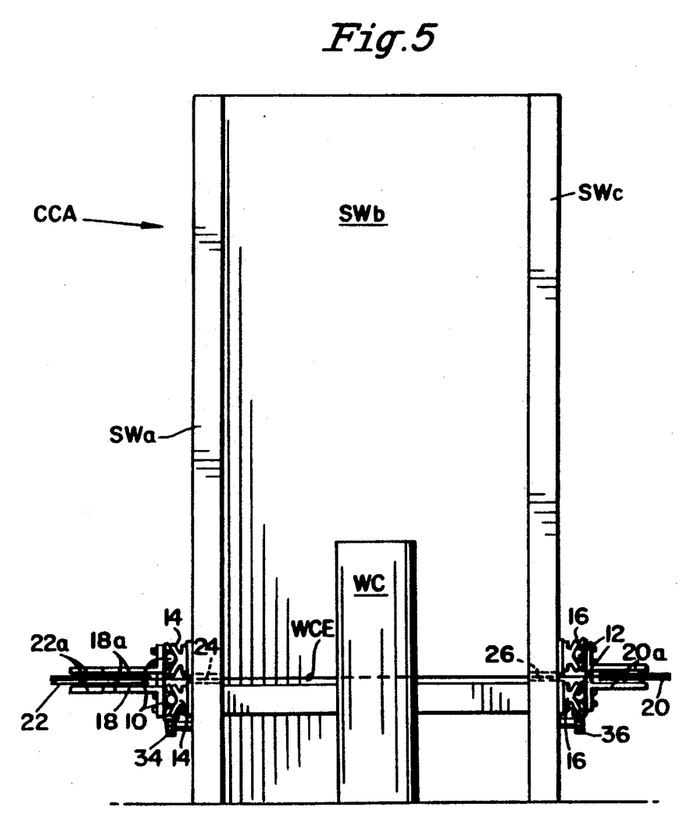

The cutting wire drive subassembly CWD includes a pairs of lateral guide rods 10, 12 which are mounted to the shield SW via slide bearing blocks 14, 16, respectively so as to allow the lateral guide rods 10, 12 to be moved reciprocally between initial and advanced positions (shown by solid and phantom lines, respectively, in FIG. 3). The wire cutting element WCE is guided by pairs of freely pivotal pulleys 18, 20 rigidly fixed to—and thus carried by) the guide rods 10 and 12—by their associated brackets 18a, 20a, respectively.

The wire cutting element WCE is tensioned between the forwardmost ones of pulleys 18, 20 via a tensioner pulley 22 which is rigidly fixed to (and thus carried by) the guide rods 10 via brackets 22a. In this connection, it will be observed that although the pulleys 18, 20 (and hence a corresponding length of the cutting wire element CWE) is located exteriorly of the shield SW, the cutting wire element CWE is nonetheless permitted to extend transversely between the shield walls $SW_a$ and $SW_c$ (i.e., so as to be positioned in the space occupied by the well WC therebetween) by opposed elongate horizontal slits 24, 26 defined in each of the opposed shield walls $SW_a$ and $SW_c$.

The rearward ends of the guide rods 10, 12 include gear racks 30, 32 which are meshed with driven pinion gears 34, 36 coupled at each end of drive shaft 38. The drive shaft 38 is journally supported for rotational movement by bearing blocks 40 and is operatively coupled to the output gear 42 of reversible motor M1 via gear 44.

The direction of reversible motor M1 (and hence the forward/rearward motion of the guide rods 10, 12) may be selected manually by an operator or controlled by means of suitable timing circuitry contained within the control panel CP. Thus, operating the reversible motor M1 so as to rotate the drive shaft 38 in a clockwise direction as viewed in FIG. 2 will cause the guide rods 10, 12, and hence that portion of the wire cutting element WCE extending between the shield walls $SW_a$ and $SW_c$ forwardly relative to the well casing WC. In such a manner, the wire cutting element WCE is brought into cutting relationship to the well casing WC and cuts the same as briefly described above.

The cutting wire drive assembly CWD controls reciprocal movement of the wire cutting element WCE by a reversible motor M2 mounted upon a support frame 50 above a supply spool 52 for the wire cutting element WCE. The frame 52 (and hence the motor M2 and supply spool 52) is itself mounted for reciprocal rectilinear motion relative to the shield SW by virtue of its bearing blocks 54 slidably coacting with fixed-position central guide rods 56 which are rigidly supported by upright frames 58a, 58b. The frame 50 includes a rearwardly projecting gear rack 60 which meshes with pinion gear 62 associated with drive shaft 38. Thus, rotation of drive shaft 38 will responsively cause the frame 50 (and hence the motor M2 and supply spool 52) to travel along the central guide rods 56 simultaneously with, and in the same direction as, the guide rods 10, 12.

Figure 6:
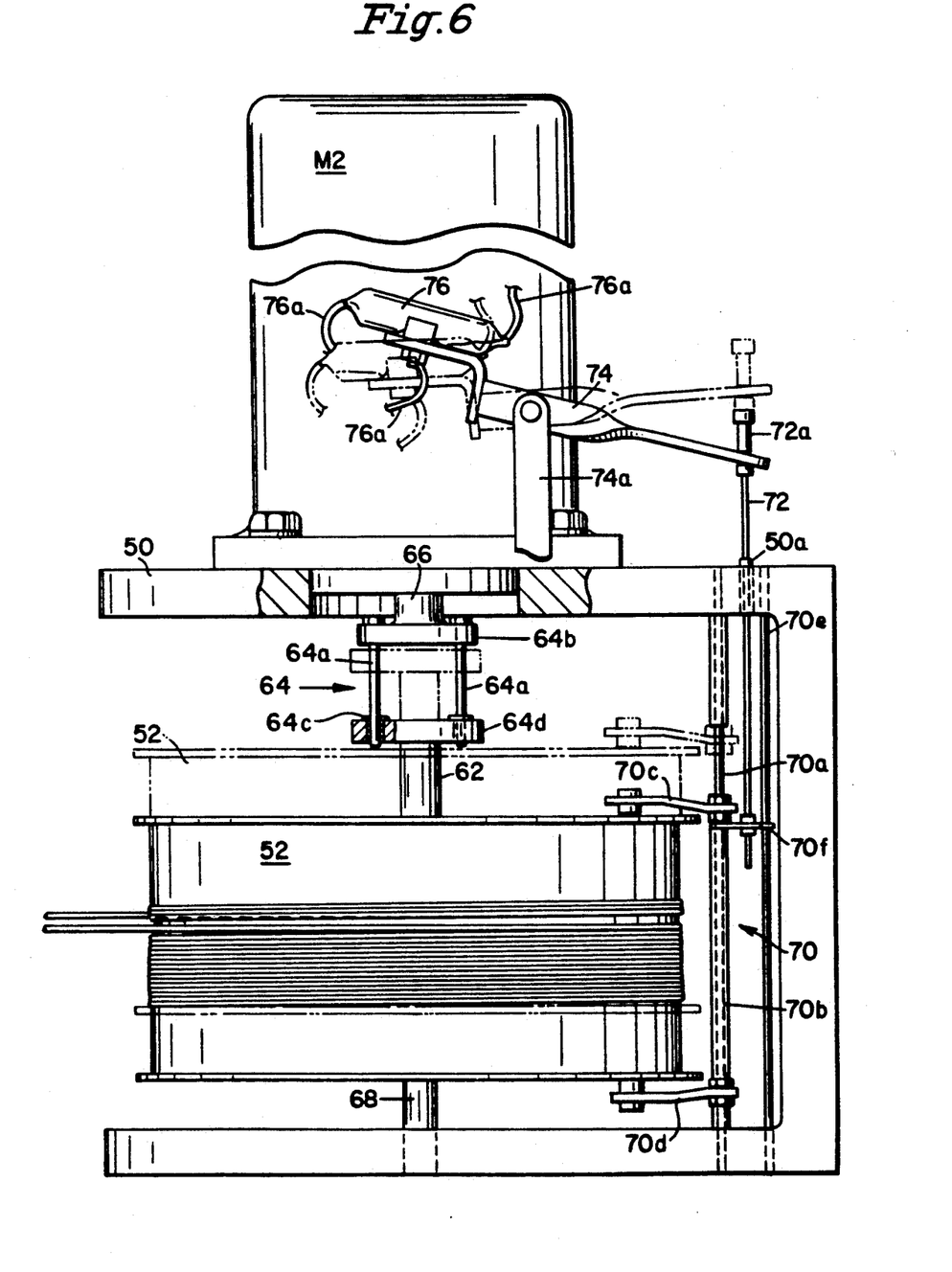
FIG. 6 is an enlarged elevation view of the wire cutting element control system.

The reciprocal (e.g., saw-like) motion of the cutting wire element CWE is preferably achieved using the mechanical control system shown in accompanying FIG. 6. However, those in this art will recognize that the functions provided by the control system shown in FIG. 6 could be provided by other equivalent control systems operating via hydraulic and/or electronic means.

It will be observed that the supply spool 52 is mounted on a vertical drive shaft 62 in such a manner to allow for vertical displacements along the axis of shaft 62 between raised and lowered positions (noted by phantom and solid lines, respectively, in FIG. 6). Rotational drive from the motor M2 is transferred to the drive shaft 62 via a slip coupling 64 which includes a number (e.g., four) fixed guide shafts 64a which depend from the flange 64b of the output shaft 66. The gudie shafts 64a are slidably mated with corresponding bushings 64c in the follower flange 64d rigidly associated with the uppermost end of shaft 62. The shaft 62 is itself telescopically sleeved over a rigid support shaft 68.

Accompanying FIG. 6 depicts in solid line a state of the wire cutting element WCE on its supply spool 52 at a point in time whereby counterclockwise motion of the wire cutting element WCE (as viewed in FIG. 3) relative to the shield SW has just terminated, and directional reversal is about to occur so that the wire cutting element WCE travels in a clockwise direction (again, as viewed in FIG. 3). As will be appreciated, the motor will turn the spool in a clockwise direction (as viewed from above which causes a continual simultaneous paying out of the wire cutting element WCE to the pulleys 20 and retrieval of the wire cutting element WCE from the pulleys 18. As a result of this wire paying out/retrieval, the spool will be displaced vertically in an upward direction (i.e., towards motor M2). Since the drive shaft 62 is sleeved over the support shaft 68, and since the guide shafts 64a are slidably received within bushings 64c, continual rotational motion will be imparted to the spool 52 during its upward displacement. As a result, the wire cutting element WCE is disposed substantially within a non-moving horizontal plane during its reciprocal (saw-like) motions.

The spool 52 is coupled to a vertically disposed follower assembly 70 which includes a an immovable primary track rod 70a and a sleeved follower tube 70b. The follower tube 70b is maintained in a fixed position relative to the spool 52 by upper and lower positioning arms 70c, 70d, respectively. A secondary track rod 70e is positioned laterally parallel to the primary track rod 70a with the space therebetween being spanned by a spacer plate 70f, respective ends of which are slidably coupled to the primary and secondary track rods 70a, 70e. The spacer plate 70f remains, however, in a fixed position relative to the spool 52 by virtue of being physically sandwiched between the terminal end of upper positioning arm 70c and the uppermost end of the sleeved follower tube. Thus, the spacer plate 70f will be vertically displaced simultaneously with vertical vertical displacements of the supply spool 52.

A vertically disposed actuating rod 72 is slidably received within the frame 50 (e.g., via bushing 50a). The actuating rod 72 has a lower end positionally fixed to the follower plate 70f and an upper end positionally fixed to an end of a control lever 74 pivotally mounted to base 50 via support 74a. The opposite end of control lever 74 carries a conventional mercury switch 76 (or equivalent attitude switching means) which is electrically coupled via pigtail wires 76a to the motor M2.

As noted above, the spool 52 is shown in solid line in FIG. 6 in a state whereby its lowered position has just been reached. Thus, the lever 74 has pivoted clockwise (as viewed in FIG. 6) due to the actuator rod 72 being downwardly displaced (i.e., since its vertical positioning follows that of the spacer plate 70f and hence the spool 52). As a result, the mercury switch 76 is tipped to cause the motor to reverse its rotational direction which is then transferred to the spool 52 via the slip coupling 64. As a result, the spool will now begin to be displaced vertically in an upward direction until it achieves its raised position shown in phantom line in FIG. 6. At this time, the lever 74 will have been pivoted counterclockwise (i.e., due to vertical upward displacement of the actuating rod 72 which follows the vertical displacement of the spool 52) to cause the mercury switch 76 be tipped in an opposite direction. As a result, the mercury switch 76 will again reverse the rotational direction of motor M2 at which time the spool will then be vertically displaced downwardly (i.e., since the wire cutting element WCE on the spool 52 will be payed out to the pulleys 18 and retrieved from the pulleys 20). This cyclical rotation reversal of motor M2 thus causes direction reversal of the wire cutting element WCE relative to the well casing WC being cut (i.e., effects a saw-like motion).

The timing of the full deflection of the mercury switch 76 (and thus the timing of rotational reversal of motor M2) may be controlled by the angular displacement of the lever 74. The angular displacement of the lever 74 can, in turn, be selected by the adjusting nut 72a which is threadably coupled to the upper end of actuating rod 72. Thus, turning movements applied to the adjusting nut 72a will responsively allow for greater/lesser angular displacements of the lever 74.

Figure 7:
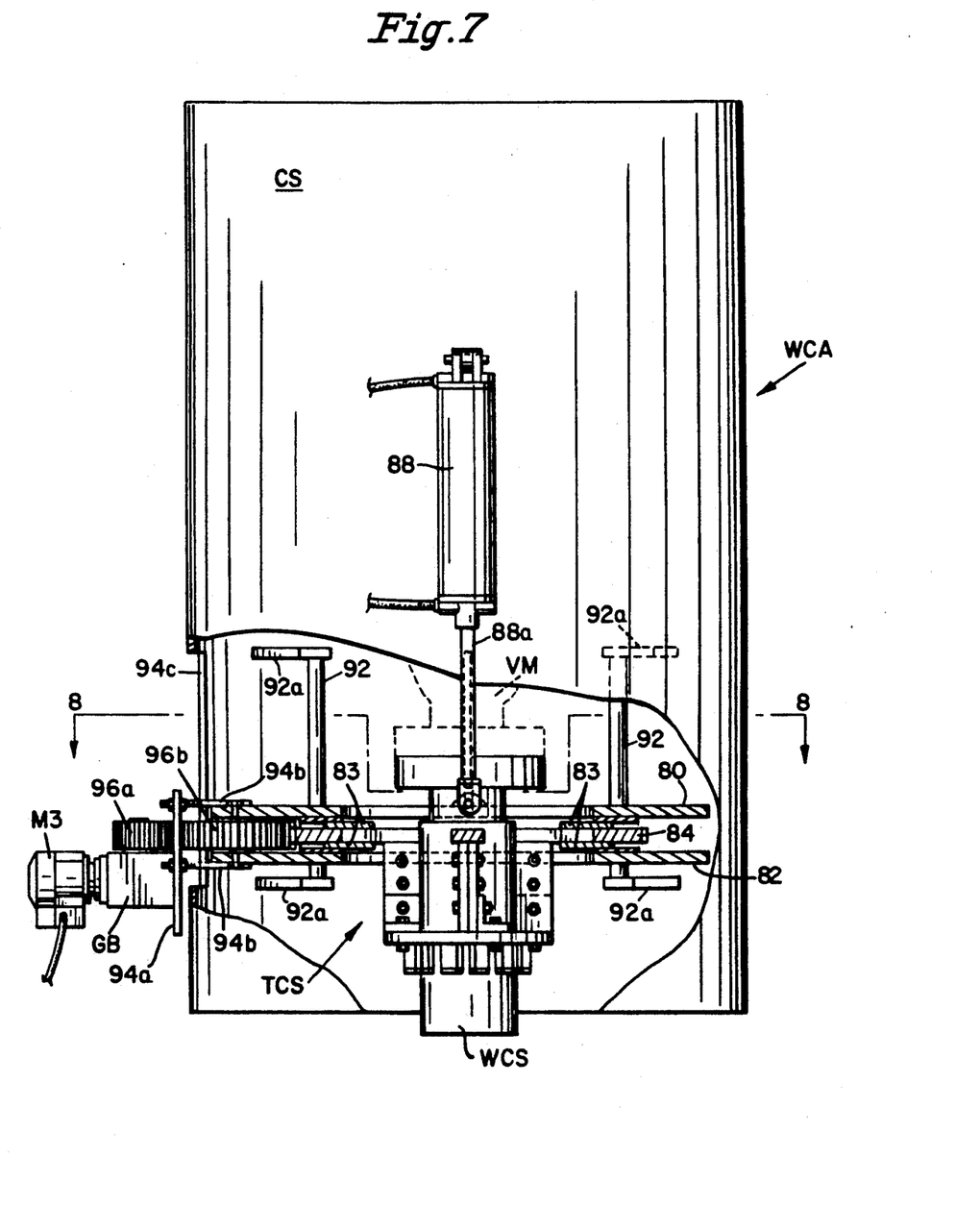
FIG. 7 is an elevation view of the capping assembly according to this invention.
Figure 8:
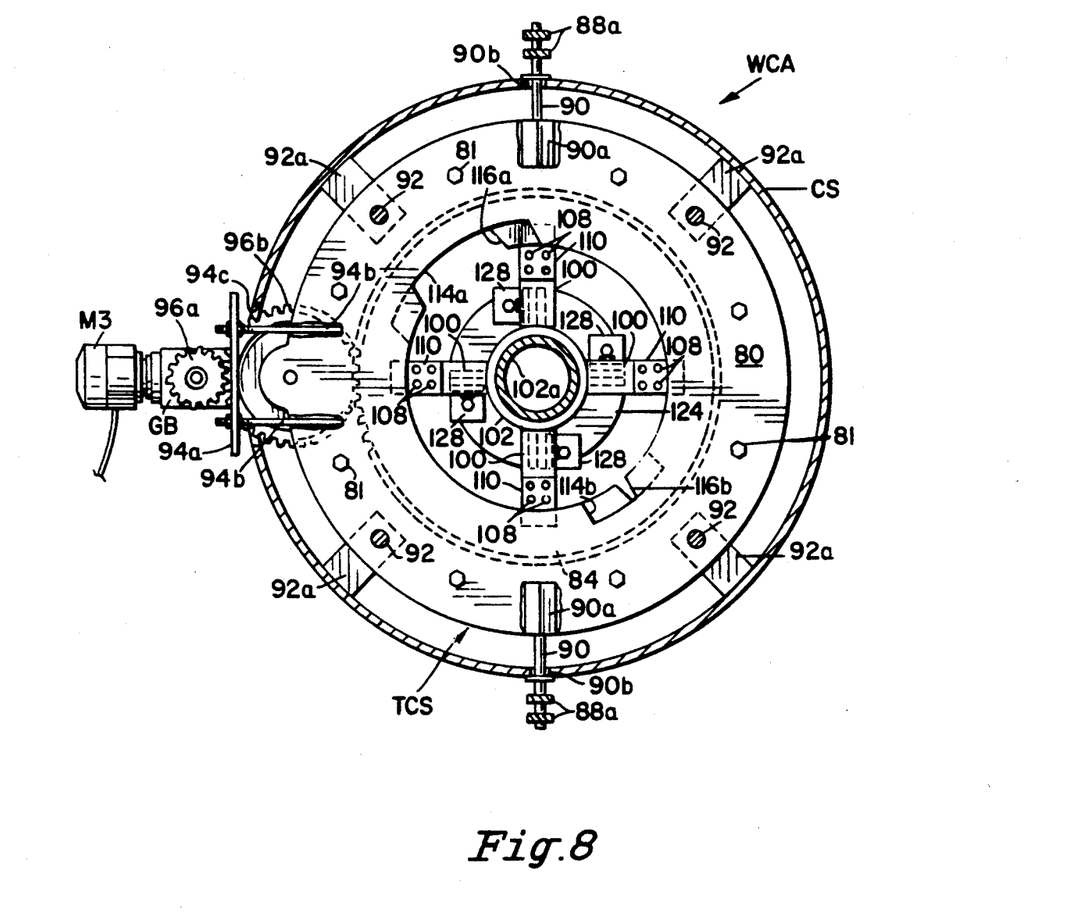
FIG. 8 is a cross-sectional plan view of the capping assembly shown in FIG. 7 as taken along line 7—7 therein.

Once the well casing Wc has been cut by the casing cutting assembly CCA, the well capping assembly WCA may then be moved into position as described above. The structures and functions of the well capping assembly WCA will be better understood from a review of accompanying drawing FIGS. 7-9. In this regard, the well capping assembly includes a metal cylindrical shield CS of sufficient thickness which provides not only worker protection, but also structural support for the the thread cutting subassembly TCS and valving mechanism VM carried thereby.

The thread cutting subassembly TCS is provided with upper and lower vertically separated support collars 80, 82 and a ring drive gear 84 sandwiched therebetween. The collars 80, 82 are rigidly coupled to one another via a series of bolts (a few of which are identified by reference numeral 81—see FIG. 8). The ring drive gear 84, on the other hand, is allowed to rotate relative to the collars 80, 82 by virtue of suitable bearing assemblies 83 (see FIG. 7). The collars 80, 82 and ring drive gear 84 are vertically displaceable as a unit by virtue of the interconnection between the actuator rams 88a of hydraulic actuators 88 (only one such actuator 88 being depicted in FIG. 7) provided by the lifting bars 90 rigidly coupled to the upper collar 80 via blocks 90a. The lifting bars 90 extend through vertically elongate slots 90b formed in the cylindrical shield CS. The collars 80, 82 slidably ride on vertical guide bars 92 which are rigidly coupled to the interior surface of the cylindrical shield CS by brackets 92a.

Rotation is imparted to the ring drive gear 84 by motor M3 and its associated gear box GB which are rigidly coupled to the upper and lower collars 80, 82 by a motor mount assembly which includes a face plate 94a which is rigidly connected (e.g., via welding) to the collars 80, 82 by support rods 94b. The support rods 94b are extend through a vertically elongate window opening 94c defined in the cylindrical shield CS. Rotational drive provided by the output gear 96a is transmitted to the ring drive gear 84 by virtue of the intermeshed reducing gear 96b. It will be appreciated therefore that the motor M3, gear box GB and its associated gears 96a, 96b will likewise move as a unit during vertical displacements of the collars 80, 82 and drive gear 84 by virtue of the rigid interconnection provided by the motor mount assembly (i.e., the face plate 94a and support rods 94b).

Figure 9:
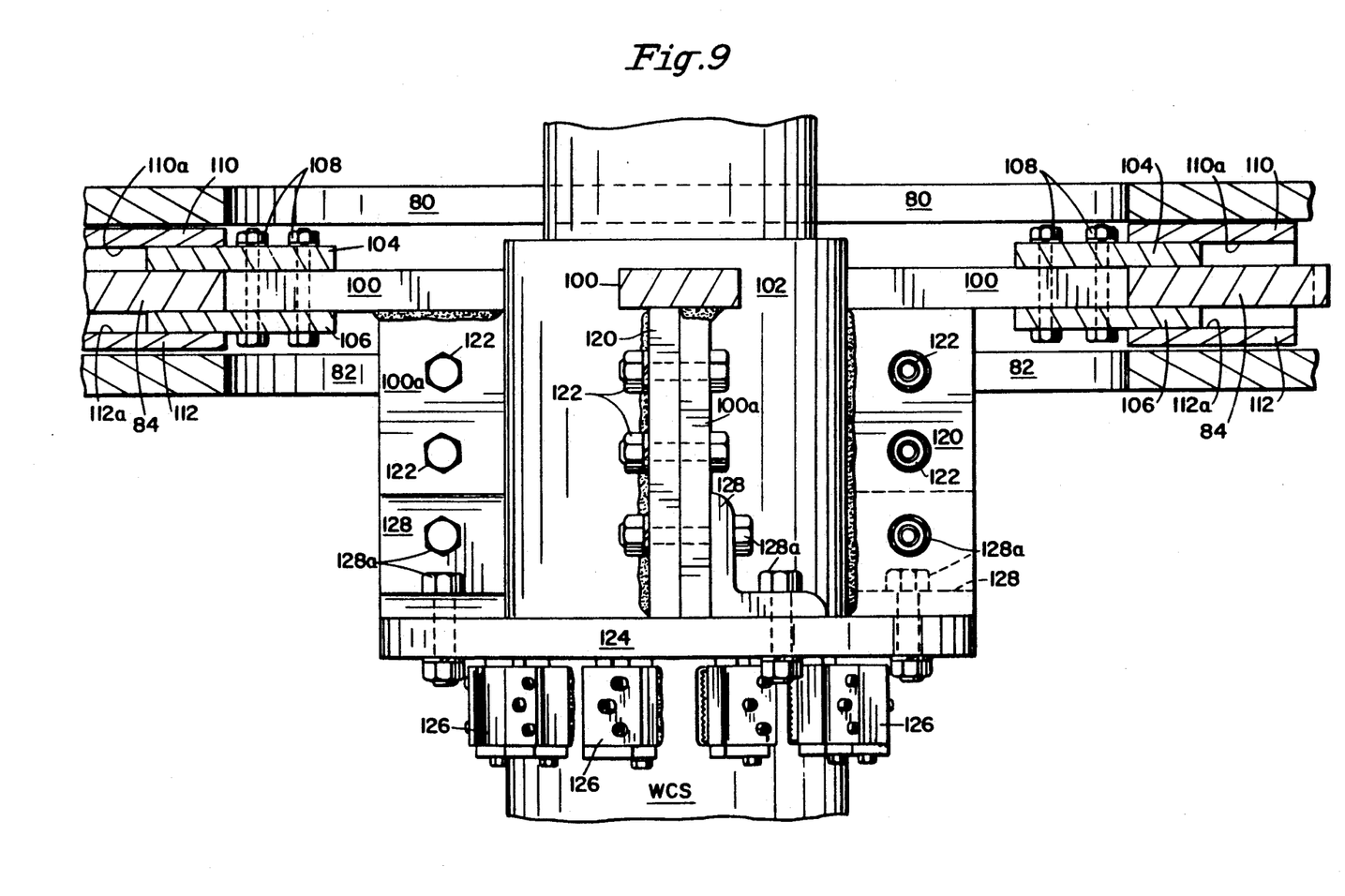
FIG. 9 is an enlarged detail elevation view of the thread-cutting subassembly according to this invention.

The well capping functions provided by the well capping apparatus WCA are better understood from accompanying FIG. 9. As is shown therein, the ring drive gear supports several (e.g., four) radial support arms 100 (only three such arms 100 being shown in FIG. 9) which are equally spaced apart circumferentially relative to the pipe coupling 102. Mounting flanges 100a are rigidly coupled (e.g., via welding) to the inner ends of respective ones of the support arms 100. The outer ends of the support arms are rigidly sandwiched between upper and lower mounting ears 104, 106 via bolt assemblies 108.

Removal of the bolt assemblies 108 will uncouple the support arms 100 and the mounting ears 104, 106 will thus enable the mounting ears 104, 106 to be slidably withdrawn from the support arms 100 into receiving cavities 110a, 112a defined within upper and lower coupling blocks 110, 112, respectively. As a result, the ring drive gear 84 will be disconnected from the support arms 100 (and hence from the pipe coupling 102) which will then enable the entire well capping assembly WCA (with the exception of those structures remaining attached to the support arms 100) to be physically removed (e.g., by lifting) from the well casing WC site. In this connection, it will be observed in accompanying FIG. 8 that the inner edges of collars 80, 82 define recessed portions 114a, 114b which are capable of being registered with similarly sized recessed portions 116a, 116b defined in the inner edge of the ring drive gear 84 by suitable controlled rotation thereof. When registered, these recesses 114a, 114b and 116a, 116b will provide sufficient clearance for any radially projection structure associated with the valving mechanism VM to pass therethrough when the well capping assembly WCA is lifted from the well casing WC site.

The mounting flanges 100a associated with the support arms 100 are rigidly (but removably) coupled to radially extending vertical mounting flanges 120 via bolt assemblies 122. The mounting flanges 120 are themselves rigidly and immovably connected to the pipe coupling 102, for example, by welding. Thus, the flanges 100a, 120 serve as support structure for the split ring die head 124 which dependently carries a suitable number of removable thread-cutting die assemblies 126. The split ring die head 124 is rigidly (but removably) coupled to the flanges 100a, 120 by angle brackets 128 and their associated bolt assemblies 128a.

In operation, the well capping assembly WCA is lowered over the well casing stub (WCS) such that the interior bore 102a (see FIG. 8) of the pipe coupling 102 (and hence the bore of the normally open valving mechanism VM carried thereby) is in coaxial alignment with the well casing stub WCS. At this point in time, however, the thread cutting assembly is at its uppermost extent of travel relative to the cylindrical shield wall CS. Once positioned, the motor M3 is operated concurrently with the actuators 88 so that the ring drive gear 84 and the structures attached thereto are simultaneously rotated and downwardly vertically displaced relative to the well casing stub WCS. The rotation and vertical displacement rates may be controlled by by suitable control systems (not shown) operating on the motor M3 and the actuators 88. In this manner, therefore, the cutting dies 126 will cut threads having the proper pitch so as to match the threads internally provided on the pipe coupling 102. Continued rotation and downward displacement of the thread cutting subassembly TCS will therefore allow the pipe coupling 102 to follow the previously cut threads and as a result threadably couple itself onto the upper end of the well casing stub WCS.

Once the pipe coupling 102 has been threaded onto the well casing stub a sufficient amount, movements of the thread cutting subassembly TCS (both rotational and vertical) are stopped. At this time, the normally open, remotely controlled valving mechanism VM is operated so as to close the bore 102a and thereby stop the uncontrolled flow of oil and/or gas therefrom. Thereafter, the support arms 100 may be disconnected from the mounting ears 104, 106 as previously described so that the rest of the well capping assembly WCA can be lifted from the now capped well casing stub WCS. The split ring die cutting head 124 and the arms 100 may then be disconnected from the flanges 120 by simply removing the bolt assemblies 122 and 128a so these components may be reused. Thus, in addition to the valving mechanism VM, the only other structure remaining on the capped well casing stub WCS is the pipe coupling 102 and its associated mounting flanges 120.

It should now fully be appreciated that the present invention provides a unique system for preparing a well casing WC for a future capping operation, in addition to providing a unique means of capping the well casing WC once it has been prepared. Therefore, while the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pipe threading apparatus comprising:
   a pair of separated annular support collars;
   a ring drive gear rotatably sandwiched between said pair of separated annular support collars;
   a thread-cutting subassembly sized to cut threads in a predetermined pipe surface and coaxially coupled to said ring drive gear such that said thread-cutting subassembly rotates as a unit with said ring drive gear; and
   a drive assembly operatively coupled to said ring drive gear for imparting rotational and longitudinal movements to said ring drive gear so as to responsively rotate and longitudinally displace said thread-cutting subassembly relative to said predetermined pipe surface and thereby cut threads in said predetermined pipe surface.

2. A pipe threading apparatus as in claim 1, wherein said drive assembly includes a motor rigidly carried by at least one of said annular support collars and operatively intermeshed with said ring drive gear.

3. A pipe threading apparatus as in claim 1 or 2; wherein said thread-cutting subassembly includes a number of removable thread cutting dies.

4. A pipe threading apparatus as in claim 3, wherein said thread-cutting subassembly includes a split ring die head for supporting said number of thread cutting dies.

5. A pipe threading apparatus as in claim 1, wherein said drive assembly further includes an actuator system coupled to at least one of said support collars for imparting said longitudinal movement to said ring drive gear and thereby displace said thread-cutting subassembly longitudinally relative to said predetermined pipe surface.

6. A pipe threading apparatus as in claim 5, wherein said actuator system includes at least one hydraulic actuator.

7. A pipe threading apparatus as in claim 1, further comprising a bearing interposed between said ring drive gear and said support collars to facilitate rotational movement of said ring drive gear.

8. A pipe threading apparatus comprising:
   a pair of separated annular support collars;
   a ring drive gear rotatably sandwiched between said pair of separated annular support collars;

a thread-cutting subassembly sized to cut threads in a predetermined pipe surface and coaxially coupled to said ring drive gear such that said thread-cutting subassembly rotates as a unit with said ring drive gear; and a drive assembly operatively coupled to said ring drive gear for imparting rotational movement to said ring drive gear to thereby rotate said thread-cutting subassembly and cut threads in said predetermined pipe surface, wherein said thread-cutting subassembly includes radial support arms each having one end rigidly coupled to said thread-cutting subassembly and an opposite end removably coupled to said ring drive gear.

9. A pipe threading apparatus as in claim 8, wherein said thread-cutting subassembly includes:

mounting blocks rigidly associated with said ring drive gear and defining respective receiving cavities; and mounting ears each received slidably within a respective receiving cavity and being removably coupled to said opposite end of a respective one of said radial support arms.

10. A pipe threading apparatus as in claim 9, wherein said mounting blocks are rigidly associated with said ring drive gear so as to provide upper and lower pairs of mounting blocks which are circumferentially spaced apart relative to one another, and wherein each said upper and lower pair of mounting blocks has an upper and a lower mounting ears slidably received within upper and lower receiving cavities respectively defined by said upper and lower pair of mounting blocks, wherein said upper and lower mounting ears sandwich a portion of a respective said radial support arm and are removably coupled thereto.

11. A pipe threading apparatus as in claim 8 or 9, wherein said thread-cutting subassembly includes a number of removable thread cutting dies.

12. A pipe threading apparatus as in claim 11, wherein said thread-cutting subassembly includes a split ring die head for supporting said number of thread cutting dies.

13. A pipe threading apparatus as in claim 12, wherein said split ring die head includes brackets which are connected to respective ones of said radial support arms.

14. A pipe threading apparatus comprising:

a pair of separated annular support collars;

a ring drive gear rotatably sandwiched between said pair of separated annular support collars;

a thread-cutting subassembly which includes a number of removable thread cutting dies sized to cut threads in a predetermined pipe surface and coaxially coupled to said ring drive gear such that said thread-cutting subassembly rotates as a unit with said ring drive gear; and a drive assembly operatively coupled to said ring drive gear for imparting rotational movement to said ring drive gear to thereby rotate said thread-cutting subassembly and cut threads in said predetermined pipe surface.

15. A pipe threading apparatus as in claim 14, wherein said thread-cutting subassembly includes a split ring die head for supporting said number of thread cutting dies.

16. A pipe threading apparatus as in claim 15, wherein said thread-cutting subassembly includes radial support arms each having one end rigidly coupled to said thread-cutting subassembly and an opposite end removably coupled to said ring drive gear.

17. A pipe threading apparatus as in claim 16, wherein said split ring die head includes brackets which are connected to respective ones of said radial support arms.

* * * * *